United States Patent [19]

Honmura et al.

[11] Patent Number: 5,249,276
[45] Date of Patent: Sep. 28, 1993

[54] ADDRESS TRANSLATION APPARATUS HAVING A MEMORY ACCESS PRIVILEGE CHECK CAPABILITY DATA WHICH USES MASK DATA TO SELECT BIT POSITIONS OF PRIVILEDGE

[75] Inventors: Tetsuro Honmura, Kawasaki; Katsuaki Takagi, Kawagoe; Shunpei Kawasaki; Nobutaka Amano, both of Tokyo; Kimio Ooe, Kawasaki, all of Japan

[73] Assignees: Hitachi, Ltd., Tokyo; Hitachi Micro Computer Engineering Ltd., Kodaira, both of Tokyo, Japan

[21] Appl. No.: 208,493

[22] Filed: Jun. 20, 1988

[30] Foreign Application Priority Data

Jun. 22, 1987 [JP] Japan .............. 62-153329

[51] Int. Cl.⁵ .............................. G06F 12/08
[52] U.S. Cl. .................... 395/400; 364/256.3; 364/256.5; 364/253.1; 364/252.5; 364/DIG. 1
[58] Field of Search ... 364/20 MS File, 900 MS File; 395/400

[56] References Cited

U.S. PATENT DOCUMENTS

| | | | |
|---|---|---|---|
| 3,983,538 | 9/1976 | Jones | 364/900 |
| 4,084,225 | 4/1978 | Anderson et al. | 364/200 |
| 4,084,226 | 4/1978 | Anderson et al. | 364/200 |
| 4,084,227 | 4/1978 | Bennett et al. | 364/200 |
| 4,170,039 | 10/1979 | Beacom | 364/200 |
| 4,241,401 | 12/1980 | DeWard | 364/200 |
| 4,326,248 | 4/1982 | Hinai | 364/200 |
| 4,525,778 | 6/1985 | Cane | 364/200 |
| 4,604,688 | 8/1986 | Tone | 364/200 |
| 4,638,426 | 1/1987 | Chang et al. | 364/200 |
| 4,669,043 | 5/1987 | Kaplinsky | 364/200 |
| 4,691,281 | 9/1987 | Furni | 364/200 |
| 4,695,950 | 9/1987 | Brandt | 364/200 |
| 4,727,484 | 2/1988 | Saito | 364/200 |
| 4,731,740 | 3/1988 | Eguchi | 364/200 |
| 4,769,770 | 9/1988 | Miyadera | 364/200 |
| 4,785,398 | 11/1988 | Joyce et al. | 364/200 |

OTHER PUBLICATIONS

John Bond, 32 bit micros advance art of memory management, Computer Design, vol. 25, No. 19, Oct. 15th, 1986, pp. 21-30.

*Primary Examiner*—Thomas C. Lee
*Assistant Examiner*—Eric Coleman
*Attorney, Agent, or Firm*—Antonelli, Terry, Stout & Kraus

[57] ABSTRACT

An address translation apparatus which includes a memory for storing a plurality of physical addresses, and a content addressable memory unit which stores a plurality of signal pairs that correspond to the plurality of physical addresses, each of the signal paris includes a logical address that corresponds to one of the plurality of physical addresses and memory protection level data that indicates a memory protection level allocated to a memory position of the one of the physical addresses. The content addressable memory unit includes apparatus for searching a signal pair that has a logical address in coincident with a logical address being subjected to address translation and comparing memory protection level data to comparative data at a bit position which is indicated to be the bit position to be searched by mask data, in response to the logical address translation. The mask data instructs whether the bits of the stored memory protection level data are to be searched, wherein mask data is determined depending upon a memory access privilege level allocated to a program that requests address translation, and whether comparative data are to be compared with the stored memory protection level data. The content addressable memory further includes apparatus for instructing the memory to produce a physical address that corresponds to the detected signal pair.

6 Claims, 10 Drawing Sheets

| LEVEL NUMBER | MEMORY ACCESS PRIVILEGE LEVEL DATA | MEMORY PROTECTION LEVEL DATA |
|---|---|---|
| 0 | 0 0 0 | 0 0 0 |
| 1 | 1 0 0 | 1 0 0 |
| 2 | 1 1 0 | 1 1 0 |
| 3 | 1 1 1 | 1 1 1 |

FIG. 3B

| MEMORY ACCESS PRIVILEGE LEVEL | | ACCESSIBLE MEMORY PROTECTION LEVEL DATA (A CORRESPONDING LEVEL NUMBER) | | | |
|---|---|---|---|---|---|
| LEVEL NUMBER | LEVEL DATA | | | | |
| 0 | 0 0 0 | 0 0 0 (0) | 1 0 0 (1) | 1 1 0 (2) | 1 1 1 (3) |
| 1 | 1 0 0 | | ①0 0 (1) | ①1 0 (2) | ①1 1 (3) |
| 2 | 1 1 0 | | | ①①0 (2) | ①①1 (3) |
| 3 | 1 1 1 | | | | ①①① (3) |

| LEVEL NUMBER | MEMORY ACCESS PRIVILEGE LEVEL DATA | MEMORY PROTECTION LEVEL DATA |
|---|---|---|
| 0 | 0 0 | 0 0 |
| 1 | 0 1 | 0 1 |
| 2 | 1 0 | 1 0 |
| 3 | 1 1 | 1 1 |

FIG. 10B
PRIOR ART

| MEMORY ACCESS PRIVILEGE LEVEL | | ACCESSIBLE MEMORY PROTECTION LEVEL DATA (A CORRESPONDING LEVEL NUMBER) | | | |
|---|---|---|---|---|---|
| LEVEL NUMBER | LEVEL DATA | | | | |
| 0 | 0 0 | 0 0 (0) | 0 1 (1) | 1 0 (2) | 1 1 (3) |
| 1 | 0 1 | | 0 1 (1) | 1 0 (2) | 1 1 (3) |
| 2 | 1 0 | | | 1 0 (2) | 1 1 (3) |
| 3 | 1 1 | | | | 1 1 (3) |

ADDRESS TRANSLATION APPARATUS HAVING A MEMORY ACCESS PRIVILEGE CHECK CAPABILITY DATA WHICH USES MASK DATA TO SELECT BIT POSITIONS OF PRIVILEDGE

BACKGROUND OF THE INVENTION

The present invention relates to an address translation apparatus for translating a logical address into a physical address. More specifically, the invention relates to an address translation apparatus adapted to a virtual storage system which deals with a multiplicity of tasks in a microcomputer system.

In the virtual storage system which deals with a multiplicity of tasks in a conventional microcomputer system, checking of memory access privilege for address translation and memory protection plays an important role in the memory management. Here, the address translation is to translate a logical address designated by a task being executed (hereinafter referred to as logical address) into a physical address on a real memory (hereinafter referred to as physical address). Checking of the memory access privilege is to check whether a memory area of the physical address is the one that is specifically allocated to other tasks, i.e., whether the memory area of the physical address is the one that should not be accessed by the task, based upon a memory protection level allocated to the memory area and upon a memory access privilege level allocated to the task. The microcomputers have been employing already an address translation apparatus which is capable of effecting both the address translation and the checking of memory access privilege. This has been discussed, for example, in Computer Design, Vol. 25, No. 19, Oct. 15, 1986, pp. 21-30.

In the conventional address translation apparatus as will be described later in detail, the address translation and the checking of memory access privilege have been carried out sequentially.

According to the conventional art, the time required for obtaining an effective physical address becomes longer than the time required for address translation by a time required for checking the memory access privilege due to the aforementioned sequential operation.

SUMMARY OF THE INVENTION

The object of the present invention is to provide an address translation apparatus which is capable of effecting the address translation and the checking of memory access privilege in parallel.

For this purpose according to the present invention, an address translation circuit includes:

a memory for storing a plurality of physical addresses, a content addressable memory which stores a plurality of signal pairs that correspond to the plurality of physical addresses, each of the signal pairs including logical address that corresponds to any one of the plurality of physical addresses and a memory protection level data that indicates a memory protection level allocated to a memory position of the one of physical addresses, the content addressable memory further searching a signal pair that has a logical address in coincident with the logical address that is to be subjected to the address translation and a memory protection level data in coincident with the comparative data at a bit position which is indicated to be the bit position that is to be searched by the mask data, in response to the logical address that is to be subjected to the address translation, a mask data which instructs whether the bits of the stored memory protection level data be searched, the mask data being determined depending upon a memory access privilege level allocated to a program that requests address translation, and comparative data that are to be compared with the stored memory protection level data, the content addressable memory further instructing said memory to produce a physical address that corresponds to the detected signal pair.

To check the memory access privilege for protecting the memory, it is necessary to discriminate whether the memory access privilege level allocated to a program (e.g., task) is smaller (or greater) than the memory protection level allocated to the memory area of a physical address which is obtained as a result of address translation. According to the present invention which employs the content addressable memory, the above-mentioned discrimination is accomplished by the content addressable memory. According to the present invention, therefore, consideration is given to the expression of data that represents the memory protection level and to the expression of data that represents the memory access privilege level, in order to utilize the fact that a single memory protection level data or a plurality of memory protection level data that can be accessed at a given memory access privilege level have particular values at particular bit positions determined by the memory access privilege level.

That is, according to the present invention, the content addressable memory stores the memory protection level allocated to the memory area of a physical address that is obtained after the address translation, the above-mentioned position is represented by a mask signal, and the content addressable memory discriminates whether the comparative data at this bit position is in coincident with the memory protection level data that has been stored in advance. The content addressable memory produces a coincidence signal for a signal pair that consists of a logical address in coincident with the logical address that is input and a single memory protection level data or any one of a plurality of memory protection level data that can be accessed with the memory access privilege level. Therefore, the memory protection level allocated to the physical address obtained by the address translation is accessed with the memory access privilege level that is allocated to the program in execution. Coincidence for the logical addresses and coincidence between the memory protection level data and the memory access privilege level data at a particular bit position, are detected by the same content addressable memory. Namely, these two coincidences are detected in parallel with each other.

DETAILED DESCRIPTION OF A PREFERRED EMBODIMENT

The conventional art will be described, first, prior to describing the embodiment of the invention In FIG. 8, reference numeral 12 denotes a level register for storing memory access privilege level data allocated to a task that is being executed, reference numeral 13 denotes an LA register for storing logical address that is to be subjected to the address translation, 15 denotes an output register for storing physical address PA that is obtained through translation, 11 denotes a mask register for storing mask data that designates a bit position that is to be addressed and searched by a content addressable memory 810, and reference numeral 82 denotes a memory access privilege level checking circuit for checking whether the memory position of physical address after translation has a memory protection level which is accessible with a task in execution. Other elements constitute an address translation buffer (hereinafter referred to as TLB) which translates a physical address into a corresponding logical address.

The address translation buffer 81 is includes the content addressable memory 810 which searches whether there is a logical address coincident with the logical address in which are input a plurality of logical address upper bit portions LA-1, LA-2, ----, LA-n, and a RAM 814 which stores in pairs the physical address upper bit portions PA-1, PA-2, ----, PA-n corresponding to the logical addresses and the memory protection level data MPL-1, MPL-2, ----, MPL-n allocated to the physical addresses.

The content addressable memory 810 consists of a memory portion 812, a decoder 811, and a control 810.

Bits (mask bits) of mask data in the mask register 11 correspond to bits of the upper bit portion LA-u of logical address in the LA register 13. When a given mask bit has a value 1, the content addressable memory 810 is instructed to compare the corresponding bits of the upper bit portion LA-u of the logical address LA with the corresponding bits of the logical addresses LA-1, LA-2, ----, that are stored. When the mask bit has a value 0, the content addressable memory 810 is instructed to invalidate the above comparison and to regard them to be coincident with each other at all times.

According to the conventional art, a bit string "1 1 ----" having a value 1 is stored as a mask data. In the conventional art, therefore, the content addressable memory 810 is instructed to effect comparison with all bits of the upper bit portion LA-u in the logical address LA.

The decoder 811 consists of a plurality of partial decoders 811-1, 811-2, ----, 811-m to which is input a pair of a bit of the upper bit portion LA-u of the logical address and a corresponding mask bit. Each partial decoder gives to the memory portion 812 two searching signals that change depending upon the combination of two input signals.

The operation of FIG. 8 will now be described in conjunction with the time chart of FIG. 9. The operation consists of two stages, i.e., address translation and memory access privilege checking as shown in FIG. 9.

(1) Address translation stage

The content addressable memory 810 searches a logical address coincident with the upper bit portion LA-u of the logical address LA. Reference numeral 815 denotes a group of hit lines that correspond to entries of the memory portion 812 of the content addressable memory 810.

When there is an entry (hit entry) that holds a logic address, e.g., LA-i (i = 1, 2, ----, or n) coincident with the upper bit portion LA-U of a logical address, the memory portion 812 sends 1 to hit line that corresponds to the entry and sends 0 to hit lines that correspond to other entries.

When there is no hit entry, a NOR gate 813 for judging mishit which receives signals from the hit line group 815 produces an output 81 of the level "1". This output 81 is sent as a mishit signal to the micro control unit (not shown) of the microcomputer (not shown).

When there is a hit entry, the RAM 814 produces a physical address upper bit portion PA-i and a memory protection level MPL-i that correspond to the hit line in response to a signal having a value 1 on the hit line that corresponds to the entry.

(2) Checking of memory access privilege level:

The checking circuit 82 checks the memory access privilege by comparing the memory protection level data MPL-i with the memory access privilege level data MAL that is stored in the level register 12 and that is allocated to a task which generates logical address LA and which is being executed.

Prior to describing the checking of memory access privilege, a relationship will be mentioned below between the memory access privilege level data and the memory protection level data. The memory access privilege is divided into several levels, and the memory protection level is divided, also, into levels of the same number as the memory access privilege levels.

Figure 10A:
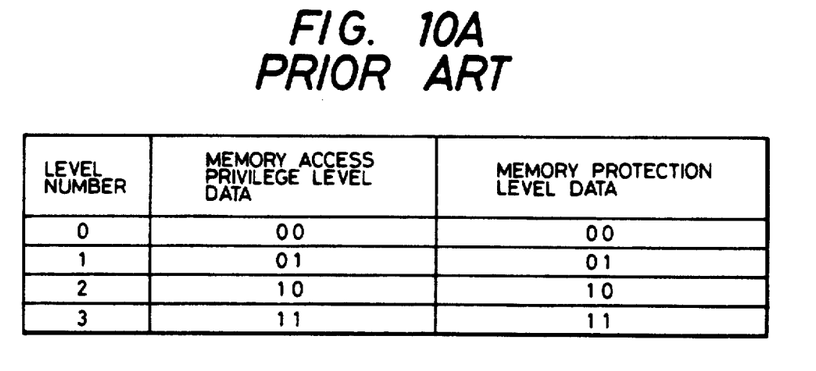
FIG. 10A; is a diagram which shows the memory access privilege level data and memory protection level data used for the apparatus of FIG. 8A.

When the total number of the memory access privilege levels and the memory protection levels is four, they are represented by level data of any one of the binary notation data 00, 01, 10, 11 as shown in FIG. 10A. In general, if the total number of the memory access privilege levels and the memory protection levels is denoted by $2^p$ (p is an integer), the memory access privilege levels and the memory protection levels are represented by binary data of p bits that assume any value ranging from 0 to $2^{p-1}$. That is, the level data that corresponds to the level of a number k is a binary data having a value k.

The memory access privilege level increases with the decrease in the value thereof.

A task that satisfies a relationship, i.e., memory access privilege level ≦ memory protection level, has an access privilege with respect to the memory.

Figure 10B:
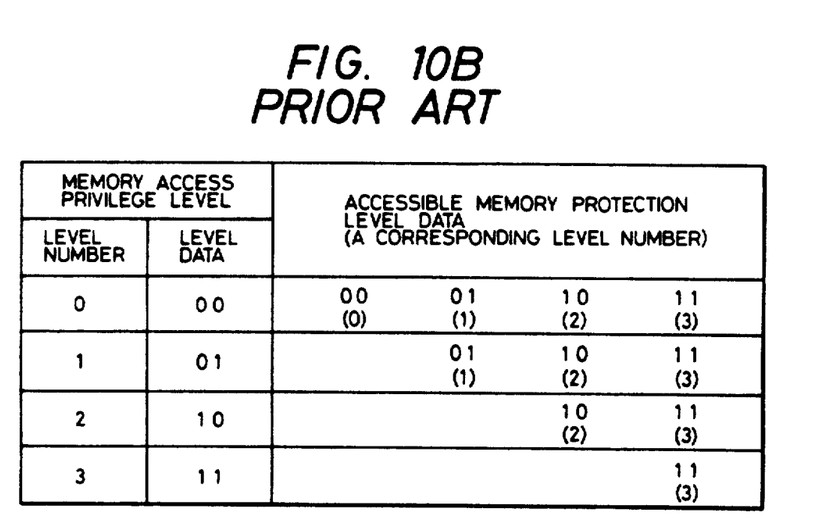
FIG. 10B is a diagram showing the memory protection level data that are accessible with the memory access privilege level data in the apparatus of FIG. 8.

FIG. 10B shows memory access privilege level data when there are four levels and protection level data that are accessible therewith. In this prior art, the level number is coincident with the value of level data.

Therefore, the checking circuit 82 judges whether the aforementioned requirement is satisfied by the memory protection level data MPL-i read by the RAM 814 and the memory access privilege level data MAL stored by the level register 12. When the above requirement is not satisfied, it is judged that the upper bit portion PA-i of the physical address is not accessible by the task, and an access privilege check error signal 821 is sent to the micro control unit (not shown).

When the signal 821 is not sent, the physical address upper bit portion PA-i and the lower bit portion LA-L of logical address LA stored in the LA register 13 are set to the output register 15, and the content in the register is used as a physical address PA after address translation.

According to the above-mentioned prior art, the address translation and the memory access privilege checking are sequentially effected. Therefore, an extra time is required for checking the memory access privilege before the effective physical address is obtained. When the entry number of the address translation buffer TLB 81 increases, in particular, an extended period of time is required for searching the logical address LA and one cycle is required for the address translation stage alone. Therefore, checking of the memory access privilege is shifted to the second cycle. Namely, two cycles are required for obtaining the effective physical address.

Limitation is obviously imposed when it is attempted to perform the address translation at high speeds in the TLB of a large scale according to the conventional system. In order to solve this problem according to the present invention, the address translation and the checking of memory access privilege are effected simultaneously.

An embodiment of the invention will now be described in detail in conjunction with the drawings.

The internal structure of a microprocessor 2 containing an address translation unit 1 of the present invention will now be explained in conjunction with FIG. 2. The microprocessor 2 is a coprocessor which is started by a signal from the host processor (not shown) and works on a micro instruction as a fundamental unit of instruction. The microprocessor 2 consists of a micro read only memory (hereinafter referred to as micro ROM) 21, a micro control unit 22, an arithmetic unit 23, an address translation unit 1, and a bus control unit 24. There are further provided an internal data bus 16 as an internal bus, and an external address bus 17 and an external data bus 25 as external buses. The unit 21 stores a micro program for controlling other units, and the unit 22 controls the micro program based upon the data from other units. The unit 23 executes a variety of arithmetic operations and stores in a register file 231 a logical address that is to be input to the address translation unit 1. The address translation unit 1 performs the address translation in parallel with the memory access privilege checking, and sends the physical address obtained through translation to an external memory 26 via the external address bus 17. The bus control unit 24 controls the external address bus 17 and the external data bus 25.

Figure 1:
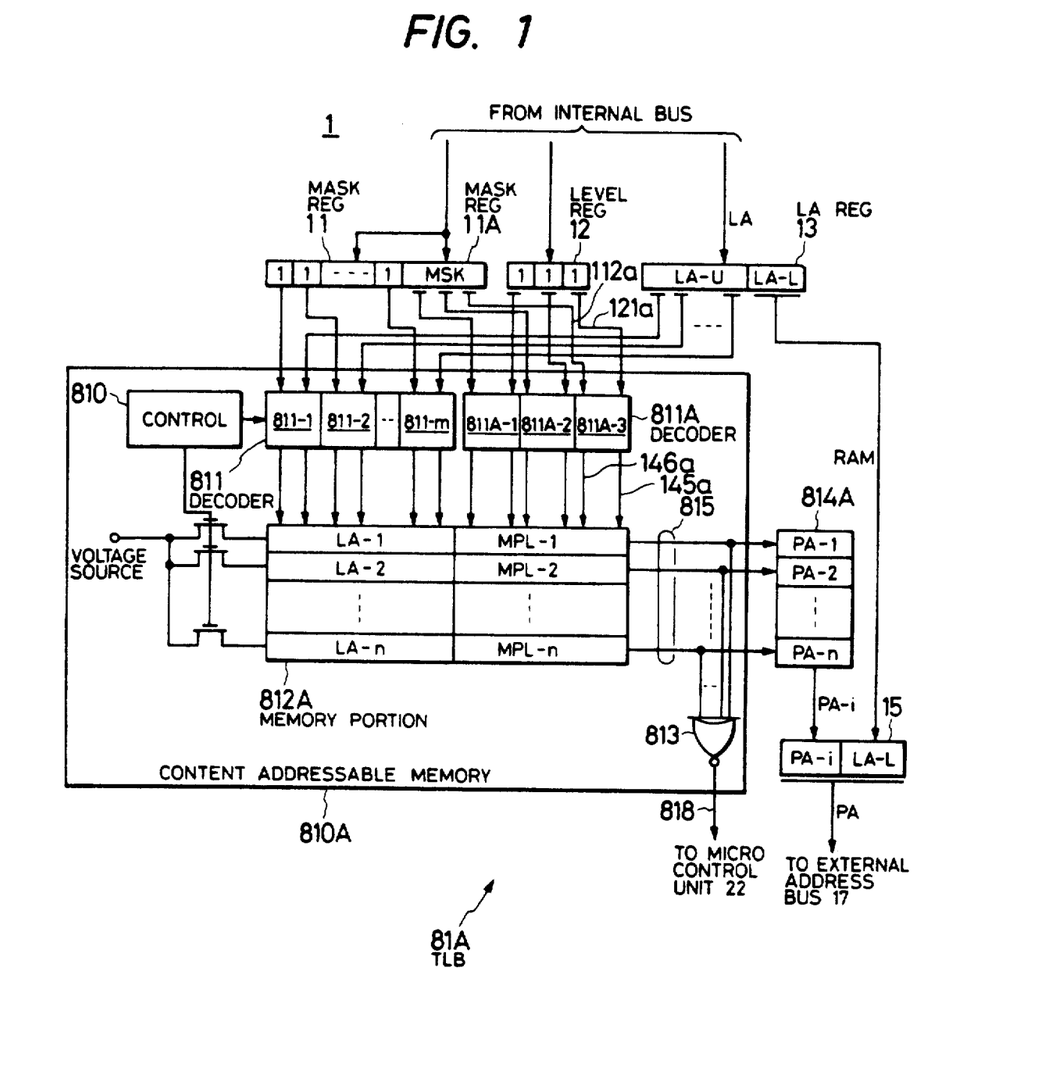
FIG. 1 is a block diagram which schematically illustrates an address translation apparatus according to the present invention.

In FIG. 1, the feature in the present invention resides in that the address translation unit 1 performs the address translation in parallel with the memory access privilege checking in one cycle, that the mask data MSK to be supplied to the address translation unit 1 is stored in the register file 231, and that the micro program in the micro ROM 21 enables the address translation and the memory access privilege checking to be executed in the same cycle accompanying the increase in the speed of the address translation unit 1.

Next, the structure of the address translation unit 1 will be explained in conjunction with FIG. 1.

Figure 8:
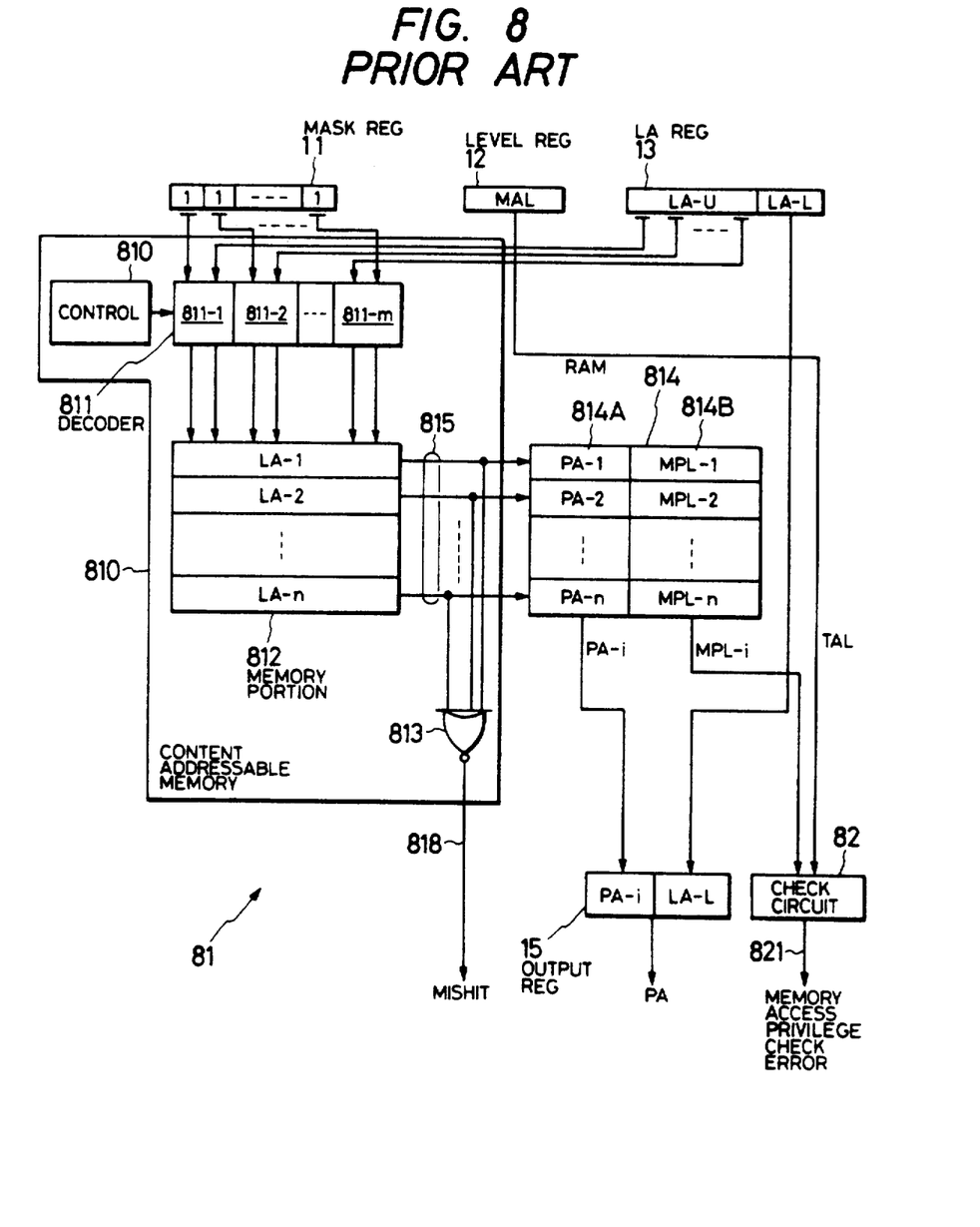
FIG. 8 is a block diagram which schematically illustrates a conventional address translation apparatus.
Figure 9:
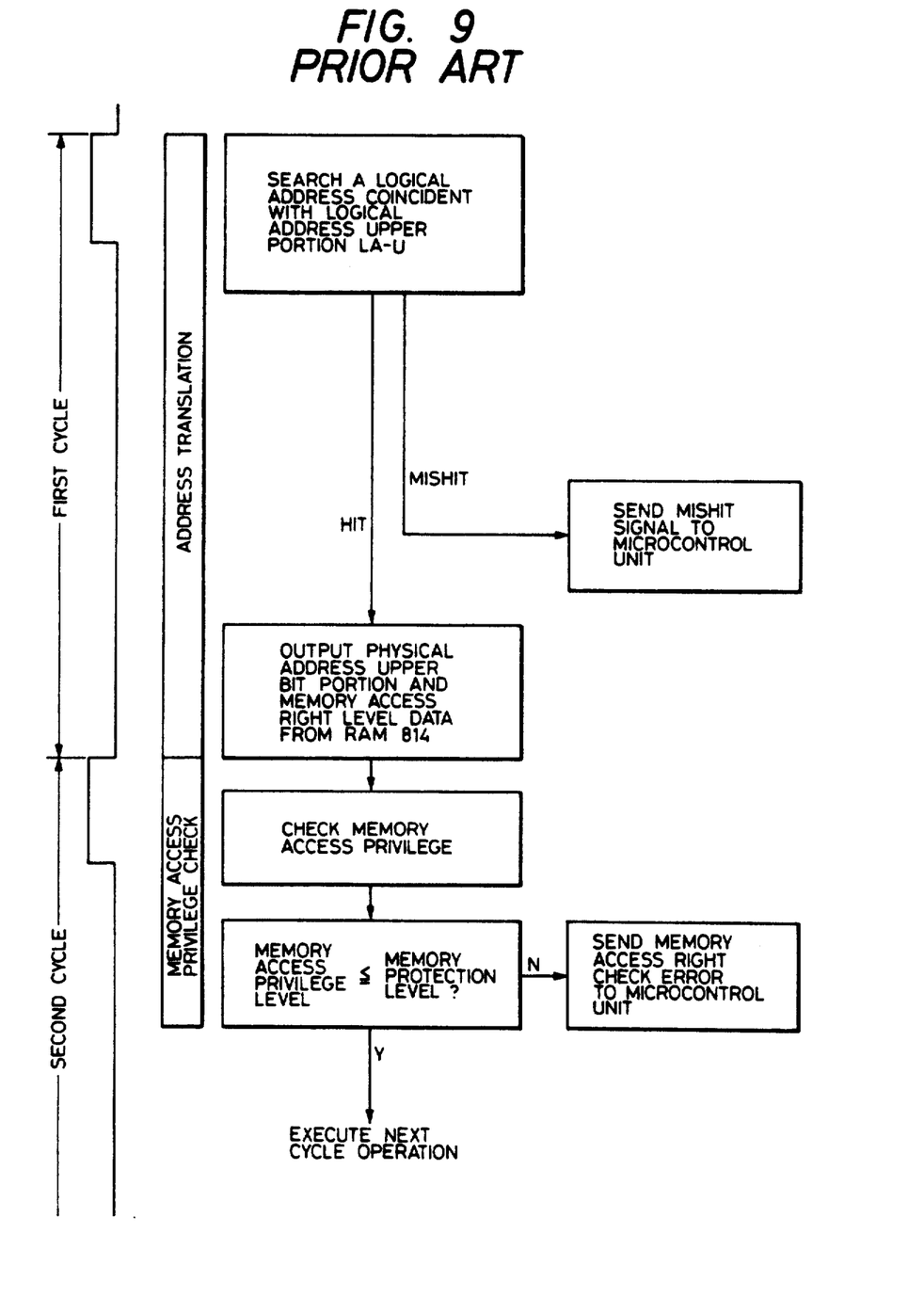
FIG. 9 is a time chart illustrating the operation of the apparatus of FIG. 8.

In FIG. 1, the portions same as those of FIG. 8 are denoted by the same reference numerals. The portions of FIG. 1 different from those of FIG. 8 are described below.

The RAM 814A which constitutes the address translation buffer TLB 81A stores only the upper bit portions PA-1 to PA-n of a plurality of physical addresses, and the memory portion 812A of the content addressable memory 810A which constitutes the TLB 81A stores in pairs the upper bit portions LA-1 to LA-n of logical addresses corresponding to the physical addresses and the memory protection level data MPL-1 to MPL-n allocated to the physical addresses. The content addressable memory 810A is provided with a decoder 811A in a portion of the memory portion 812A that stores the memory protection level data MPL-1 to MPL-n. The decoder consists of three partial decoders 811A-1 to 811A-3 that are provided to correspond to bit positions of the memory protection level MPL-1, MPL-2, ----, or MPL-n. These partial decoders have the same structure as the partial decoders 811-1 to 811-m in the decoder 811. Each of these partial decoders receives a bit of data in the level register 12 and a corresponding bit in the mask data MSK in the mask register 11A which is newly provided according to the present invention. In the level register 12 have been set a string of 1 of three bits as a comparative data irrespective of the memory access privilege level of the task that is being executed. The mask data MSK has the same bit number as the bit number of comparative data in the level register 12. When a bit of the mask data MSK has a value 1, the content addressable memory 810A is instructed to effect the comparison to search the coincidence with respect to a bit of comparative data in the level register 12 corresponded to the bit. When the bit of the mask data MSK has a value 0, the content addressable memory 810A is instructed not to effect the comparison for a bit of comparative data in the level register corresponding to the bit position, and it is regarded that the coincidence is obtained relative to the above bit. Namely, the mask register 11A is used to accomplish the same object as the mask data in the mask register 11. According to the embodiment of the present invention, however, a bit in the mask data is allowed to assume a value 0 unlike that of the conventional art. That is, the value of the mask data MSK is set to be equal to the memory access privilege level data allocated to the task which has requested the address translation.

The memory access privilege level data and the memory protection level data used in the present invention are different from those of the conventional art.

The above two level data will now be explained.

Figure 3A:
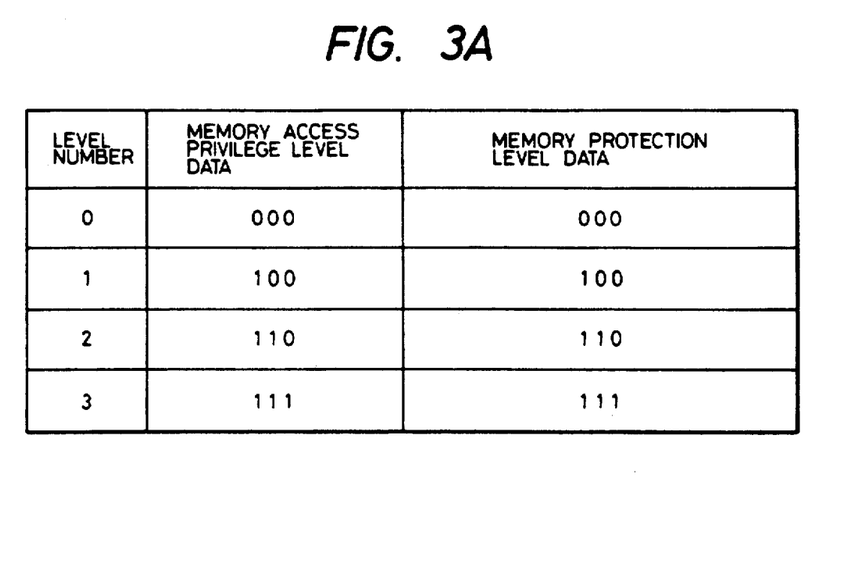
FIG. 3A is a diagram showing the memory protection level data and the memory access privilege data used for the apparatus of FIG. 2.

When the total number of levels is four as shown in FIG. 3A, both the memory access privilege level data and the memory protection level data consist of three bits having at the head portions thereof bits of a value "1" or bit strings of a number i when the level number is i. Generally, when the total number of levels is k, both of the above-mentioned two kinds of level data are represented by k−1 bits having at the head portions thereof bits of a value "1" or bit strings of a number of 1 for the level 1.

Figure 3B:
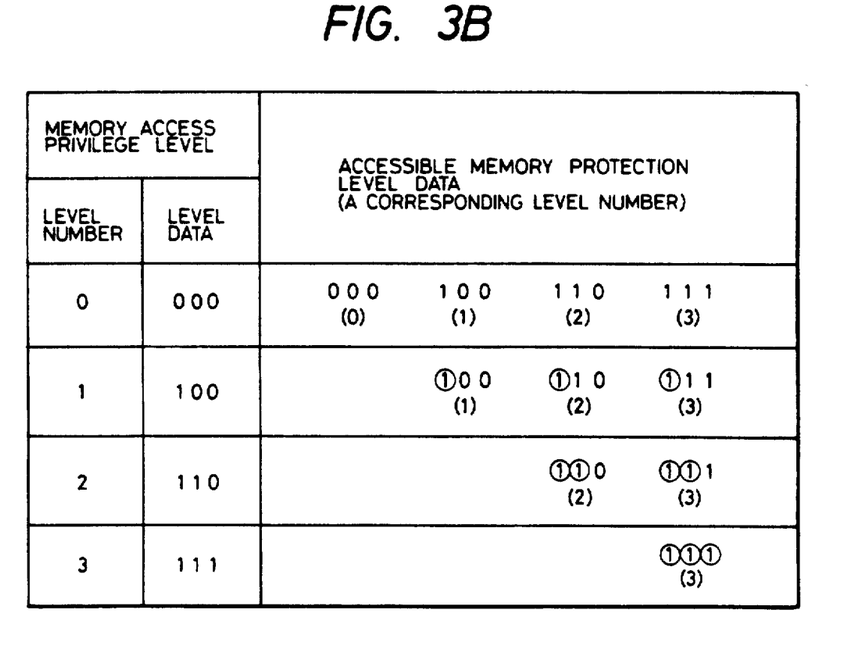
FIG. 3B is a diagram showing the memory protection level data that are accessible with the memory access privilege level data used for the apparatus of FIG. 1.

Like in the conventional art, the memory protection level in the memory area accessible with a given memory access privilege level is lower than that of the former one. Therefore, the memory protection level data of a memory area accessible with the memory access privilege data of FIG. 3A are as shown in FIG. 3B.

That is, the memory protection level data of the memory area accessible with a given memory access privilege level data has a bit position (surrounded by a circle in FIG. 3B) with a value 1 that corresponds to the bit position of a value "1" of the former one, and has other bit positions of a value that may be different from the value of the corresponding data in the former one. In other words, it is examined whether a given memory protection level data has a value 1 or not for all bits of the value "1" in a given memory access privilege level data, in order to determine whether the memory area to which the memory protection level data are given is accessible with the memory access privilege level data.

When the whole bits have a value 0 like in the level data for the memory access privilege level 0, the level data may give access to all memory protection levels in compliance with the same judging method.

The embodiment of FIG. 1 utilizes this fact. Namely, the data same as the memory access privilege level data allocated to the task that has requested the address translation is set as a mask data in the mask register 11A, and the bit strings all having u the value "1" are set to the level register 12. The content addressable memory 810A judges whether there is any data among the stored memory protection level data MPL-1 to MPL-n that is coincident with the value "1" in the level register 12, for one or a plurality of bit positions having the level data value 1. The content addressable memory 810A, however, does not render this judgement for other bit positions. When there are detected memory protection level data MPL-i that are coincident with the above-mentioned one or a plurality of bit positions, it is judged that the data are accessible with the memory access privilege level data.

As for the data to be set to the level register 12 as will be obvious from the above description, the mask data MSK need have a value 1 for the bits of a value 1. Therefore, like the mask data MSK, the comparative data in the level register 12 may exactly be the memory access privilege level data.

Generally speaking, the data may have a value 1 at the same bit positions as the bits of a value 1 in the memory access privilege level data. In this embodiment, the bit strings that are all "1" are used as the simplest data. This is the simplest data used for any memory access privilege level data.

According to the present invention as described above, it is determined whether there is a coincident memory protection level data at a particular bit position or at a plurality of bit positions of the memory access privilege level data, in order to detect memory protection level data accessible with the memory access privilege level data.

Figure 4:
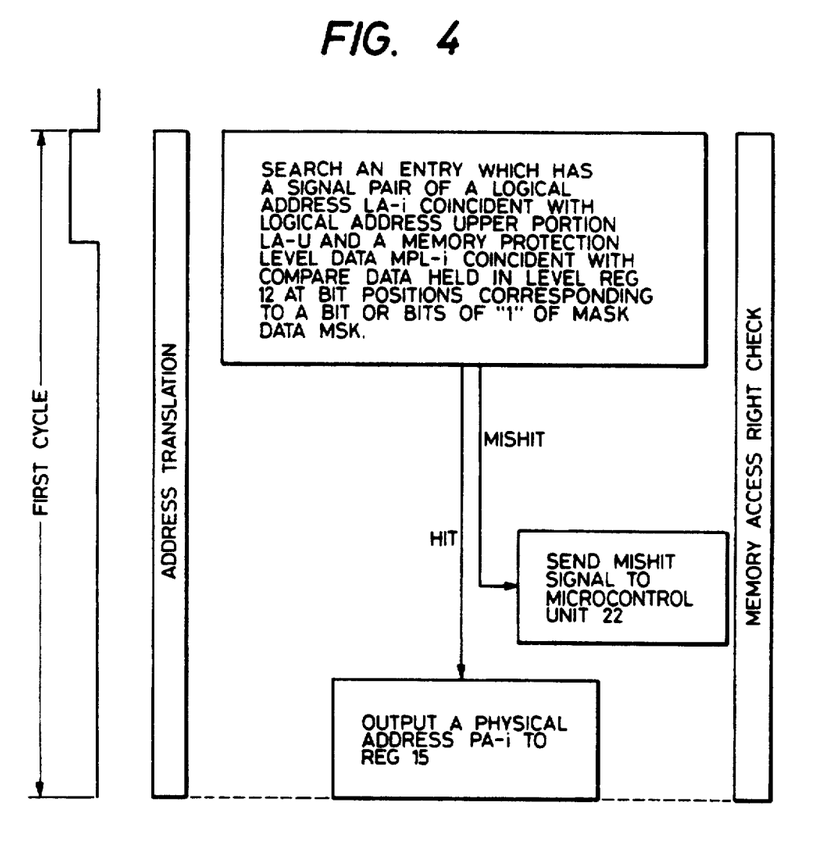
FIG. 4 is a time chart illustrating the operation of the apparatus of FIG. 1.

Operation of the apparatus of FIG. 1 will now be explained with reference to a time chart of FIG. 4.

In response to the bit strings which are all 1 in the mask register 11, the decoder 811 sends to the memory portion 812A the signals that correspond to bits of the upper bit portion of logical address LA in the LA register 13, and the decoder 811A sends to the memory portion 812A the signals corresponding to the value 1 of corresponding bit positions in the level register 12 for the bit having value 1 in the mask data MSK in the mask register LA, and sends to the memory portion 812A a signal that invalidates the comparative operation irrespective of the value "1" of corresponding bit positions in the level register 12 for the bit having value 0 of the mask data MSK. When there is an entry that has a logical address upper bit portion LA-u coincident with the upper bit portion LA-u of logical address LA in the LA register 13 and a memory protection level data MPL-i with a bit that is coincident with a value 1 in the level register 12 for the bit positions other than the bit position to which is input a signal that invalidates the comparative operation, the memory portion 812A produces "1" to any one of a group of hit lines 815 in response to the outputs of the decoders 811 and 811A, and the RAM 814A produces a physical address PA-i of an entry that corresponds to the hit line. This is combined together with the logical address lower bit portion LA-L in the LA register 13, set to the output register 15 as a physical address PA, and is sent to the external memory 26 via the external address bus 17. When there is no hit entry, the NOR gate 813 sends a mishit signal to the micro control unit 22 (FIG. 2).

Figure 5:
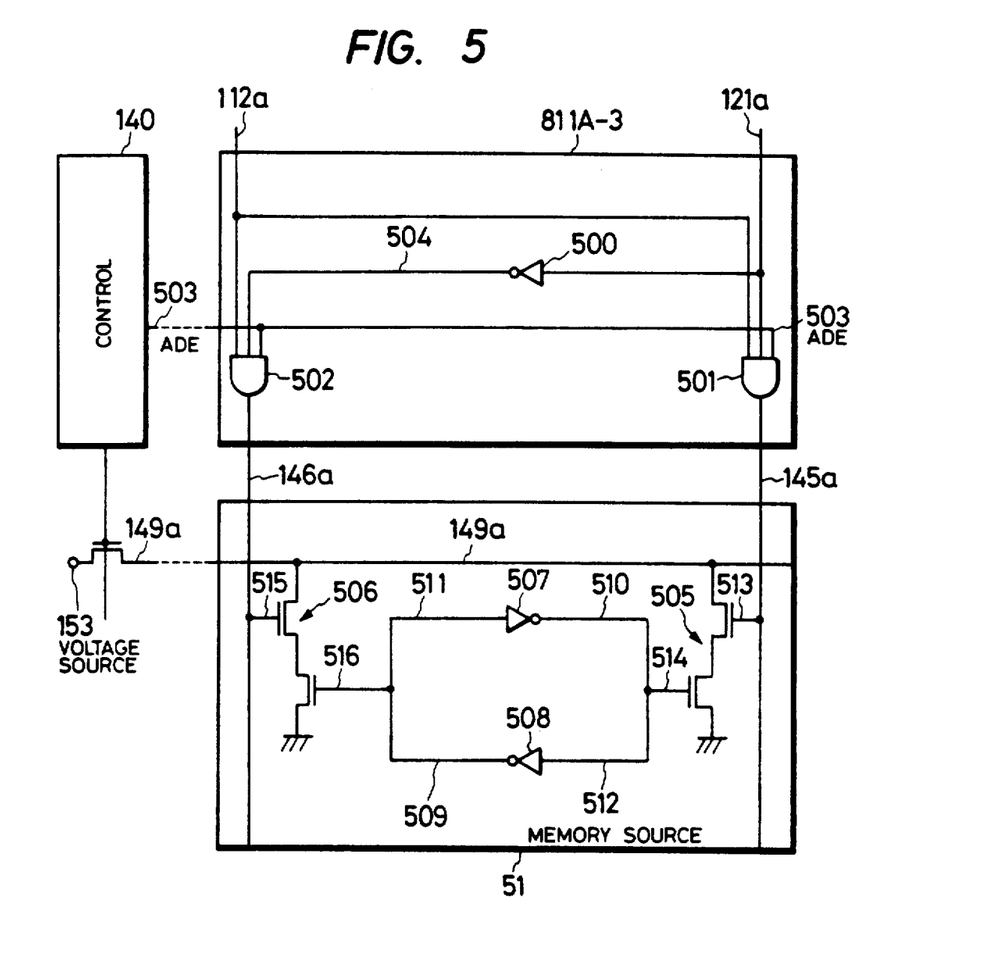
FIG. 5 is a circuit diagram illustrating in detail a partial decoder and a memory cell employed in the apparatus of FIG. 1.

FIG. 5 illustrates a partial decoder 811A-3 and a memory cell 51 connected thereto.

Other partial decoders 811-1 to 811-m also have the same structure as the partial decoder 811A-3, and other memory cells in the memory portion 812A have the same structure as the memory cell that is shown.

The partial decoder 811A-3 consists of an inverter circuit 500 and AND circuits 501 and 502. Reference numeral 121a denotes a signal line through which a bit "1" of the level register 12 is input, and 112a denotes a signal line through which a mask bit is input from either the mask register 11 or 11A. Reference numeral 503 denotes a signal line for inputting an address data enable signal ADE from the control 140.

When a signal on the signal line 112a is 1, the partial decoder 811A-3 sends to the word lines 145a and 146a a signal that is equal to the signal on the input line 121a and a signal obtained by inverting the above signal. When the signal on the signal line 112a is 0, on the other hand, both of the signals on the word lines 145a and 146a become 0.

The memory cell 51 is a circuit consisting of n-type MOS transistors, i.e., consisting of two sequential circuits 505 connected to the word line 145a and to the hit line 149a provided for the memory cell, two sequential circuits 506 connected to the word line 146a and to the hit line 149a, and a latch which consists of inverter circuits 507 and 508 connected to these two sequential circuits 505 and 506. In this memory cell, a signal is stored in the signal line 511, and the potential of the signal line 511 corresponds to the value of data that is stored.

Described below is the operation of the memory cell 51 of the case where the memory cell 51 stores the lowest bit of the data MPL-1 at the uppermost entry in the memory portion 812A in conjunction with FIGS. 6A to 6C.

Operation of the memory cell includes three cases, i.e., (a) the case where the data of the memory cell is compared with the signal of the signal line 121a and is found to be coincident therewith, (b) the case where the above comparison is invalidated, and (c) the case where the comparison indicates that the signals are not coincident with each other.

Figure 6A:
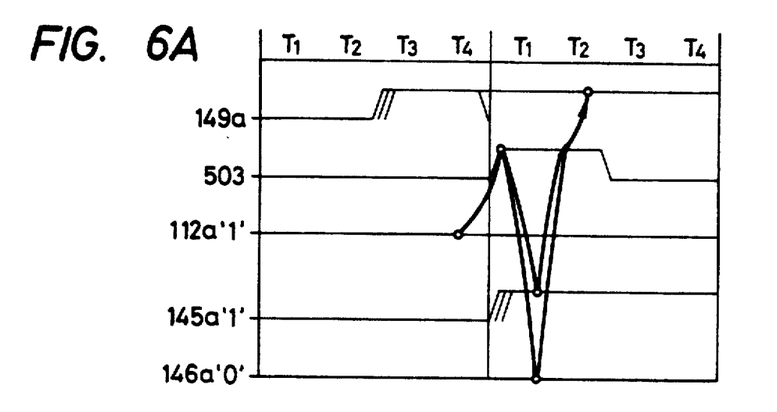
FIGS. 6A, 6B, and 6C are time charts illustrating the operation of the apparatus of FIG. 5.

(a) The case where the comparison indicates that the signals are coincident with each other (FIG. 6A)

This is the case where the mask data MSK in the mask register 11A is "111" and the memory protection level data in the memory portion 812A is "111". That is, this case takes place when the signal line 112a for inputting the lowest bit of the mask data MSK is "1" and the signal value is "1" on the signal line 511 that has a signal level that indicates the lowest bit of the memory protection level data MPL-L.

First, in the hit line 149a is accumulated an electric charge from a power source 153 during a cycle $T_3$ to $T_4$ that precedes the address translation cycle. This is referred to as precharge. Next, the signal ADE 503 assumes the level "1" during the address translation cycle $T_1$ to $T_2$, and the word line 145a connected to the output of the AND circuit 501 assumes "1" since the signal lines 112a and 121a both assume "1". The word line 146a connected to the output of the AND circuit 502 assumes "0" since the output 504 of the inverter 500 is "0". At this moment, the two nMOS sequential circuits 505 and 506 are rendered nonconductive, and the hit line 149a maintains the electric charge. The two nMOS sequential circuits 505 are rendered nonconductive because of the reason that the nMOS gate input line 514 assumes "0" since the signal on the signal line 511 is "1" and the nMOS on the grounding side is nonconductive. Similarly, the two nMOS sequential circuits 506 are rendered nonconductive since the nMOS gate input line 515 assumes "0" and nMOS on the side of the hit line 149a is nonconductive. Since the two nMOS sequential circuits 505 and 506 are rendered nonconductive, the hit line 149a maintains the level "1" as shown in FIG. 6A, and the comparison indicates that the signals are coincident with each other.

(b) The case where the comparison is invalidated (FIG. 6B):

This is the case where the mask data MSK in the register 11A is "110" and the memory protection level data MPL-1 in the memory portion 821A is "110" or "111". That is, this case takes place when the signal line 112a for inputting the lowest bit of MSK assumes "0" and the signal line 511 assumes "0" or "1" in the memory that indicates the lowest bit of the memory protection level. It is regarded that the signals are coincident with each other as a result of comparison irrespective of whether the signal line 511 assumes Like in the case (a), the hit line 149a is precharged during the cycle $T_3$ to $T_4$ that precedes the address translation. Since the signal line 112a assumes "0", both the word lines 145a and 146a assume "0". Therefore, both the nMOS gate input lines 513 and 515 assume "0", the two nMOS sequential circuits 505 and 506 are rendered nonconductive, and the hit line 149a maintains the electric charge.

Figure 6B:
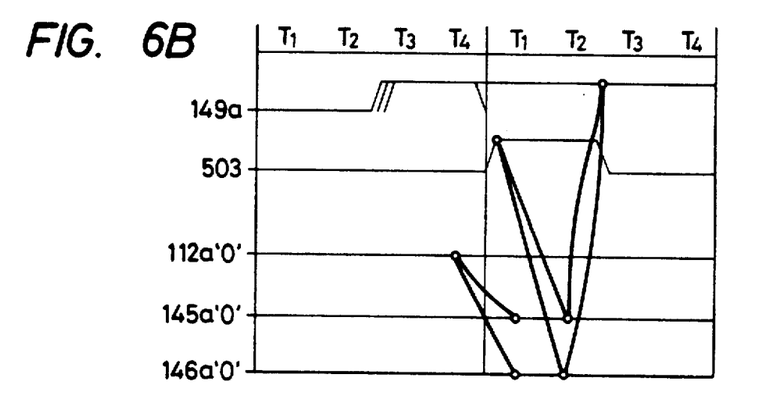

As shown in FIG. 6B, therefore, the level "1" is maintained on the hit line 149a, and it is regarded that the result of comparison indicates the coincidence. (c) The case where the result of comparison indicates the noncoincidence (FIG. 6C):

This is the case where the mask data MSK in the mask register 11A is "111" and the memory protection level data MPL-1 in the memory portion 812A is "110". Therefore, this case takes place when the signal line 112a for inputting the lowest bit of the mask data MSK assumes "1" and the signal line 511 assumes "0" in the memory that indicates the lowest bit of the memory protection level data MPL-1.

Figure 6C:
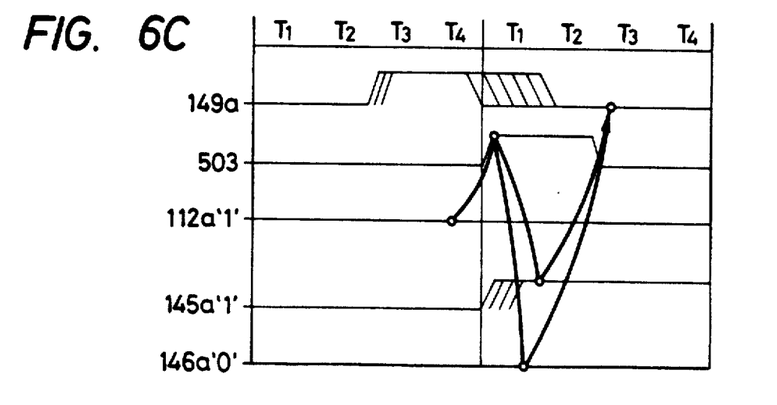

As shown in FIG. 6C, the precharging is effected during the cycle $T_3$ to $T_4$ that precedes the address translation like in the cases (a) and (b). As the signal ADE 503 assumes the level "1" during the address translation cycle $T_1$ to $T_2$, the outputs 145a and 146a of the AND circuits 501 and 502 assume the levels "1" and "0", respectively, in the same way as in the case (a). Therefore, the nMOS gate input lines 513 and 514 both assume the level "1", the two nMOS sequential circuits 505 are rendered conductive, and the electric charge of the hit line 419a flows into the ground. As shown in FIG. 6C, therefore, the hit line 149a assumes the level "0", and the result of comparison indicates the noncoincidence.

The above-mentioned operation of the memory cell is common for all bits in the memory portion 812A. When the result of comparison for all bits of an entry indicates the coincidence, the hit line 149a maintains the level "1". If the comparison indicates that even a single bit is not coincident, the hit line 149a assumes the level "0". That is, whether an effective entry is searched or not is judged depending upon a value of the hit line of the entries.

Figure 2:
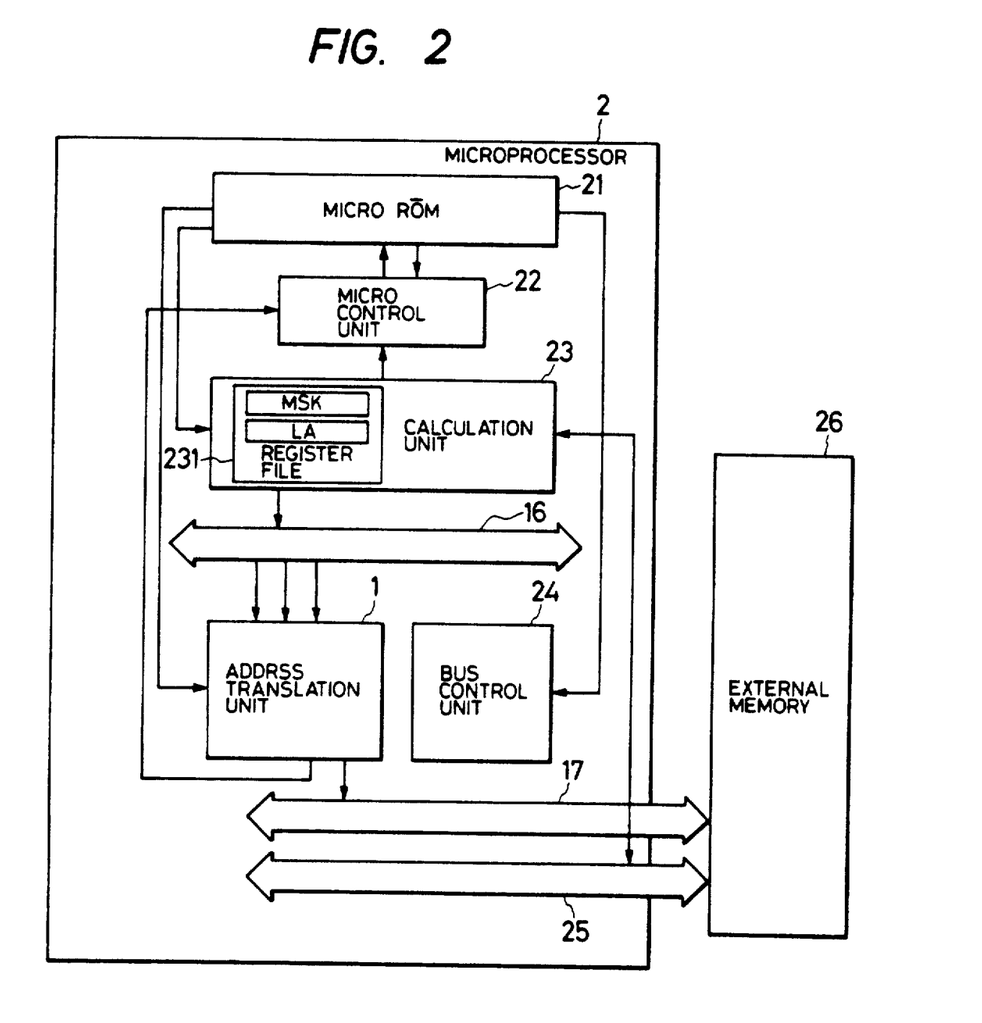
FIG. 2 is a diagram illustrating the structure of a microprocessor system that includes an address translation apparatus of FIG. 1.

When there is no hit entry, the output 818 of the NOR gate 813 assumes the level "1" which is transmitted as a mishit signal to the micro control unit 22 (FIG. 2).

The processing of the microprocessor in this case will now be explained.

Figure 7:
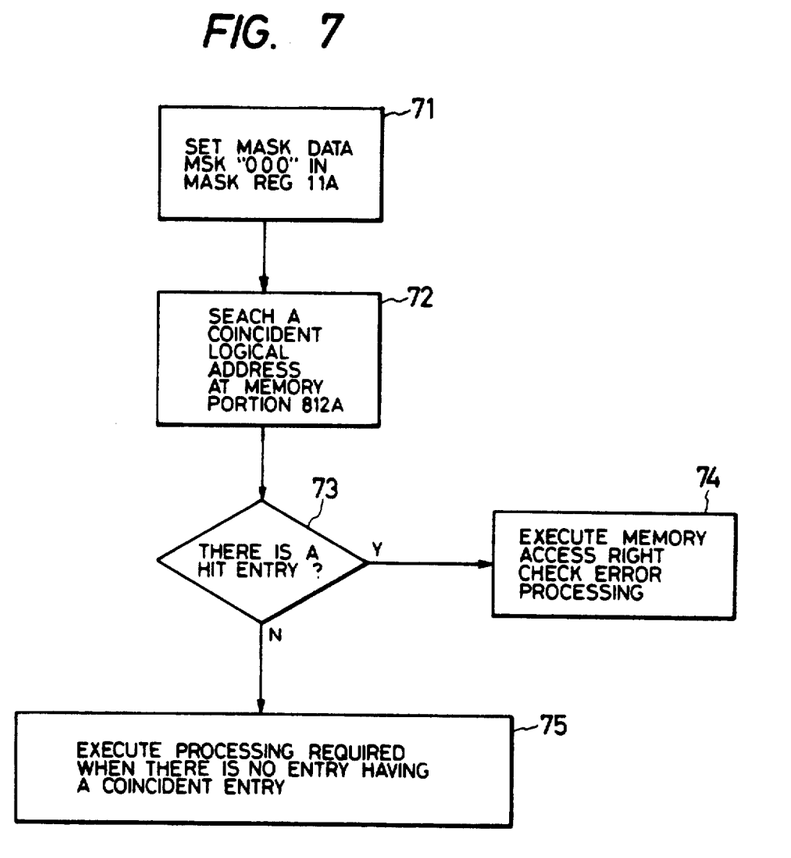
FIG. 7 is a flow chart of non-coincidence processing in the apparatus of FIG. 2.

Upon receipt of a mishit signal, the micro control unit 22 starts a micro program for noncoincidence processing that is stored in the micro ROM 21. The micro program discriminates whether the cause of noncoincidence is the noncoincidence of LA1 or the memory access privilege check error, and performs the error processing. FIG. 7 is a flow chart of a micro program for this discrimination processing.

First, "000" is set to the MSK of mask register 11A from the register file 231 via the internal data bus 16 (step 71). That is, comparison for the memory protection level data is invalidated. Next, an entry is searched that holds an upper bit portion LA-u of the logical address in the memory portion 812A (step 72). Whether there exists a hit entry is determined (step 73). When there is a hit entry but the mishit signal 818 is not produced, the memory access privilege check error processing 74 is effected. When there is no hit entry but the mishit signal 818 is produced, it is so judged that there is no entry that holds logical address which is equal to the upper bit portion LA-X of the logical address, and the processing is effected (step 75).

Processings in the steps 74 and 75 are the same as those of the conventional art, and are not described here.

The aforementioned embodiment has employed the memory protection level data and the memory access privilege data that are shown in FIG. 3A. The present invention, however, is in no way limited thereto only but includes a variety of modifications without departing from the scope of the claims.

The present invention makes it possible to effect the address translation and the memory access privilege checking simultaneously, that have heretofore been performed sequentially. Therefore, the invention does not require a time for the memory access privilege checking that was so far necessary in addition to the time required for the address translation. Namely, the invention makes it possible to realize a memory management unit that has a memory protection function and that operates at high speeds.

What is claimed is:

1. An address translation apparatus comprising:
   a physical address memory for storing a plurality of physical addresses; and
   a content addressable memory unit connected to said physical address memory for storing a plurality of signal pairs that correspond to said plurality of physical addresses and instructing said physical address memory to read out one of the physical addresses corresponding to one signal pair selected from a plurality of signal pairs, each of said signal selected from a plurality of signal pairs, each of said signal pairs including a logical address that corresponds to one of said plurality of physical addresses and memory protection level data that indicates a memory protection level allocated to a memory position of said one of said physical addresses;
   said instructing being performed in response to a logical address being subjected to an address translation from said logical address, to memory access privilege level data for a memory access privilege level allocated to a program that requests the address translation, and to mask data that indicates one or plural bit positions of the memory access privilege level data;
   said selected one signal pair having a logical address corresponding to said logical address being subjected to said address translation and memory protection level data corresponding to the memory access privilege level data at each of the one or plural bit positions indicated by said mask data.

2. An address translation apparatus according to claim 1, wherein said content addressable memory comprises:
   a first decoder which, in response to said logical address, produces a first plurality of signals each having a value that depends on a value of a corresponding bit of the logical address;
   a second decoder which, in response to said memory address privilege level data and said mask data, produces a second plurality of signals each having a value depending on a value of a corresponding bit at one of said one or plural bit positions indicated by said mask data among bit strings of said memory access privilege level data, and which produces a third plurality of signals each indicative of invalidation of comparison and each one of bits of said memory access privilege level data at other than said one or a plural bit positions indicated by said mask data; and
   a memory portion connected to said first and second decoders and responsive to said first to third plurality of signals storing said signal pairs, detecting said one signal pair, and instructing said physical address memory to read out the physical address that corresponds to said detected signal pair.

3. An address translation apparatus according to claim 1, wherein said memory access privilege level data have, at one or plural bit positions, a bit value possessed by all of one or a plurality of memory protection level data for one or plural memory protection levels accessible with said memory access privilege level at said one or plural bit positions and said mask data has a specific value at a same one or plural bit positions as the one or plural bit positions of the memory access privilege level data.

4. An address translation apparatus according to claim 3, wherein each of said stored memory protection level data has a bit string of one or plural bits each of a predetermined value, of a bit number determined depending upon corresponding memory protection level, and said mask data has a bit string of one or plural bits each of a predetermined value of a bit number determined depending upon said memory access privilege level allocated to the program.

5. An address translation apparatus according to claim 4, wherein said memory access privilege level data comprise a bit string of one or plural bits each having a value same as said predetermined value and a bit number of the bit string is equal to a bit number of a bit string of the predetermined value included in any of the one or plural memory protection levels accessible with the memory access privilege level allocated to the program contained in said memory protection level data.

6. An address translation apparatus according to claim 4, wherein said data is the same as said memory access privilege level data.

* * * * *